United States Patent
Akuzawa

(10) Patent No.: US 10,933,748 B2
(45) Date of Patent: *Mar. 2, 2021

(54) POWER SUPPLY SYSTEM FOR VEHICLE

(71) Applicant: TOYOTA JIDOSHA KABUSHIKI KAISHA, Toyota (JP)

(72) Inventor: Ken Akuzawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,846

(22) Filed: Jul. 11, 2019

(65) Prior Publication Data
US 2020/0070661 A1 Mar. 5, 2020

(30) Foreign Application Priority Data
Aug. 30, 2018 (JP) .............................. JP2018-161527

(51) Int. Cl.
*B60L 1/00* (2006.01)
*B60L 3/00* (2019.01)
*B60L 3/04* (2006.01)
*G05D 1/02* (2020.01)

(52) U.S. Cl.
CPC .............. *B60L 1/00* (2013.01); *B60L 3/0084* (2013.01); *B60L 3/04* (2013.01); *B60L 2210/10* (2013.01); *G05D 1/0223* (2013.01); *G05D 2201/0213* (2013.01)

(58) Field of Classification Search
CPC .... B60L 1/00; B60L 3/00; G05D 1/00; G05D 2201/00
See application file for complete search history.

(56) References Cited

U.S. PATENT DOCUMENTS

2017/0197565 A1* 7/2017 Yoneyama .......... B60R 16/0231
2017/0349048 A1 12/2017 Nakayama et al.
2018/0219407 A1* 8/2018 Nakamura ........... G01R 31/382
(Continued)

FOREIGN PATENT DOCUMENTS

DE 102015200124 A1 7/2016
DE 102015222544 A1 5/2017
DE 102016200097 A1 7/2017
(Continued)

OTHER PUBLICATIONS

U.S. Appl. No. 16/507,475, filed Jul. 10, 2019.
(Continued)

*Primary Examiner* — Rexford N Barnie
*Assistant Examiner* — Joseph N Inge
(74) *Attorney, Agent, or Firm* — Oliff PLC

(57) ABSTRACT

A power supply system for a vehicle includes: a high-voltage battery; a first power supply arrangement; a second power supply arrangement; and a third power supply arrangement, wherein the first power supply arrangement is connected to a first load including at least an autonomous driving system and includes a first DC-DC converter, a first battery, and a connection control unit, the connection control unit being configured to control a connection state between the first DC-DC converter and the autonomous driving system and a connection state between the first battery and the autonomous driving system.

7 Claims, 1 Drawing Sheet

(56) References Cited

U.S. PATENT DOCUMENTS

2019/0283609 A1* 9/2019 Symanow ............. B60L 3/0092
2020/0070753 A1* 3/2020 Akuzawa ................. B60L 1/10

FOREIGN PATENT DOCUMENTS

| DE | 102016221250 A1 | 5/2018 | |
|----|----|----|----|
| EP | 3354520 A1 | 8/2018 | |
| JP | 2017-127112 A | 7/2017 | |
| JP | 2017-218013 A | 12/2017 | |
| JP | 2018-068040 A | 4/2018 | |
| WO | 2015/082113 A1 | 6/2015 | |
| WO | WO-2015082113 A1 * | 6/2015 | ................ H02J 1/08 |

OTHER PUBLICATIONS

Maja Diebig et al; "Optimizing Multi-Voltage Automotive Power Supply Systems Using Electro-Thermal Simulation"; Dec. 1, 2014; 16 pgs.

Jul. 24, 2020 Notice of Allowance issued in U.S. Appl. No. 16/507,475.

Oct. 30, 2020 Notice of Allowance issued in U.S. Appl. No. 16/507,475.

* cited by examiner

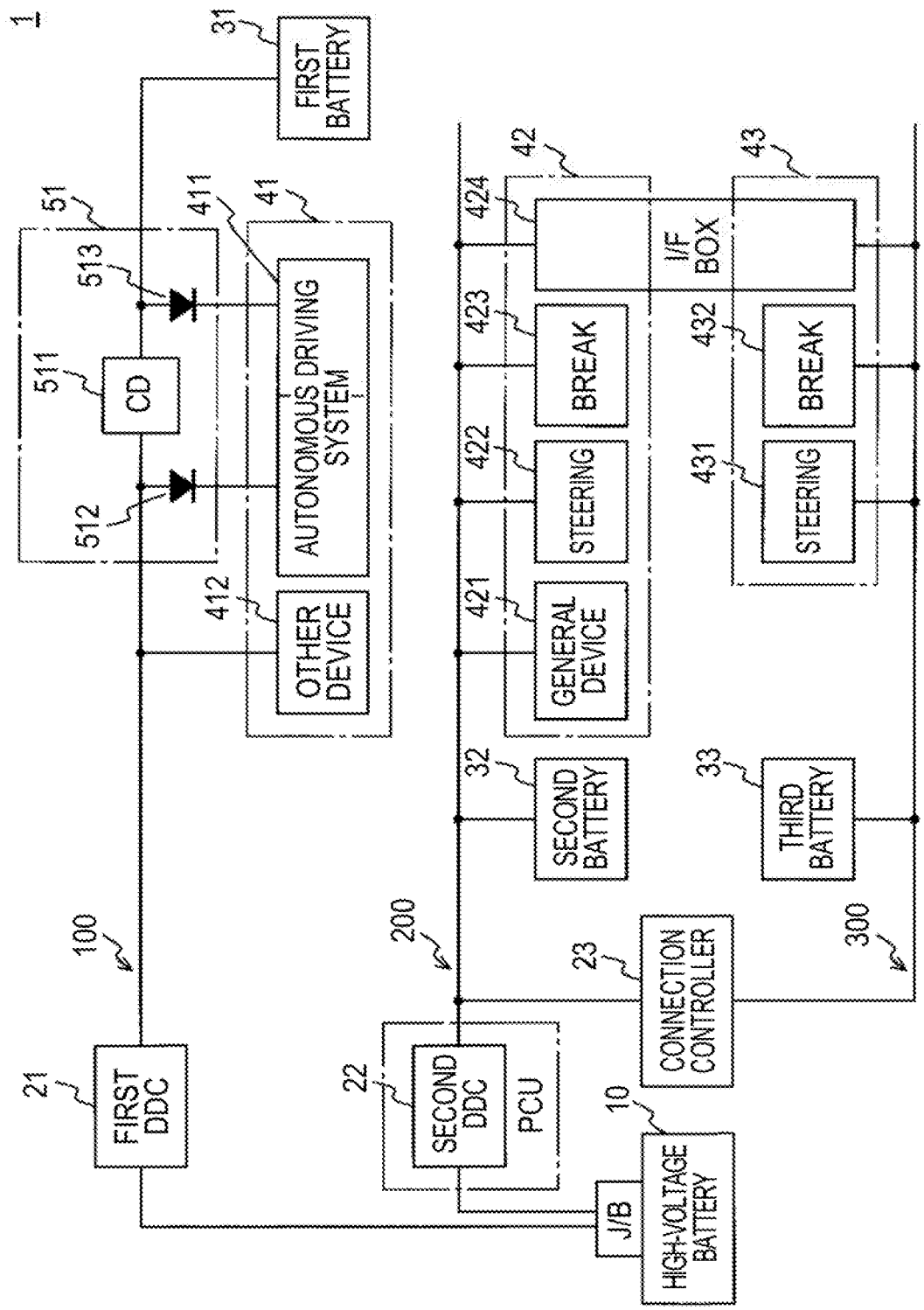

POWER SUPPLY SYSTEM FOR VEHICLE

INCORPORATION BY REFERENCE

The disclosure of Japanese Patent Application No. 2018-161527 filed on Aug. 30, 2018 including the specification, drawings and abstract is incorporated herein by reference in its entirety.

BACKGROUND

1. Technical Field

The disclosure relates to a power supply system for a vehicle.

2. Description of Related Art

Japanese Unexamined Patent Application Publication No. 2017-218013 (JP 2017-218013 A) discloses a power supply system for a vehicle in which a power supply that supplies electric power to a driving support system including adaptive cruise control (ACC), lane-keeping assist (LKA), and automatic brake is redundantly constituted by a main power supply and a sub power supply (a backup power supply). In such a power supply system for a vehicle, even when an abnormality has occurred in the main power supply during operation of the driving support system, the driving support system can continue to operate using the sub power supply.

SUMMARY

In the power supply system for a vehicle described in JP 2017-218013 A, employing a configuration for connecting the autonomous driving system to a power supply system of an existing onboard infrastructure is conceivable. However, in the configuration for connecting the autonomous driving system to a power supply system of an existing onboard infrastructure, the autonomous driving system is directly affected by a voltage variation which is generated in a load group of an onboard infrastructure. Accordingly, there is a likelihood that a voltage which is supplied to the autonomous driving system will be destabilized.

When an abnormality occurs in the autonomous driving system during automated driving, or the like, behavior for causing a vehicle to move safely to a road shoulder or the like is required. Accordingly, in the autonomous driving system, there is room for consideration of a failsafe for supplying a load with electric power required for escape behavior of a vehicle when a power failure occurs in a main power supply or the like.

The disclosure provides a power supply system for a vehicle that corresponds to a failsafe and can stabilize a power supply system of an autonomous driving system.

A power supply system for a vehicle according to an aspect of the disclosure includes a high-voltage battery; a first power supply arrangement supplied with electric power from the high-voltage battery; a second power supply arrangement supplied with the electric power from the high-voltage battery; and a third power supply arrangement supplied with the electric power from the high-voltage battery, wherein the first power supply arrangement is connected to a first load including at least an autonomous driving system, the first power supply arrangement includes a first DC-DC converter, a first battery, and a connection control unit, the first DC-DC converter is configured to convert a voltage of electric power which is supplied from the high-voltage battery and to output voltage-converted electric power, the first battery is supplied with electric power output from the first DC-DC converter, the connection control unit is connected between the first DC-DC converter and the first battery, the connection control unit is configured to control a connection state between the first DC-DC converter and the autonomous driving system and a connection state between the first battery and the autonomous driving system, the second power supply arrangement is connected to a second load including at least a steering ECU, a brake ECU, and an information communication unit, the information communication unit is configured to transmit control information to the autonomous driving system and to receive the control information from the autonomous driving system, the second power supply arrangement includes a second DC-DC converter, and a second battery, the second DC-DC converter is configured to convert the voltage of electric power which is supplied from the high-voltage battery and to output voltage-convened electric power, the second battery is supplied with electric power output from the second DC-DC converter, the second power supply arrangement is configured to supply the electric power output from the second DC-DC converter and electric power of the second battery to the second load, the third power supply arrangement is connected to a third load including at least the steering ECU, the brake ECU, and the information communication unit, the third power supply arrangement includes a connection controller and a third battery, the connection controller is configured to control a connection state between the second DC-DC converter and the third load, the third battery is supplied with electric power output from the second DC-DC converter via the connection controller, and the third power supply arrangement is configured to supply the electric power output from the second DC-DC converter to the third load via the connection controller and to supply electric power of the third battery to the third load.

In the above aspect, the connection controller may include: a coupling device configured to control a connection state between the first DC-DC converter and the first battery; a first rectifier element provided between a first power supply line and a power supply line of the autonomous driving system, the first power supply line connecting the first DC-DC converter and the coupling device, and the first rectifier element performing rectification from the first DC-DC converter to the autonomous driving system, and a second rectifier element provided between a second power supply line and the power supply line of the autonomous driving system, the second power supply line connecting the first battery and the coupling device, and the second rectifier element performing rectification from the first battery to the autonomous driving system.

In the above aspect, the coupling device may be configured to electrically isolate the first battery from the first DC-DC converter when an abnormality occurs in any one of the first DC-DC converter and the lira battery.

In the above aspect, the connection controller may be a third DC-DC converter configured to convert a voltage of input electric power and to output voltage-convened electric power or a semiconductor relay configured to switch between a connected state and a disconnected state.

In the above aspect, the autonomous driving system may be configured to control the steering ECU and the brake ECU based on the control information.

In the above aspect, the information communication unit may be configured to store the control information received from the autonomous driving system.

In the above aspect, the control information may include information on an automated driving plan which is generated by the autonomous driving system.

The power supply system for a vehicle according to the disclosure corresponds to a failsafe and can stabilize a power supply system of an autonomous driving system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram schematically illustrating a configuration of a power supply system for a vehicle according to an embodiment of the disclosure.

DETAILED DESCRIPTION OF EMBODIMENTS

Outline

According to the disclosure, a power supply system in which a power supply system of an autonomous driving system is isolated from a power supply system of an onboard infrastructure is constructed. Accordingly, it is possible to restrain the power supply system of the autonomous driving system from being affected by a voltage variation which is generated in the power supply system of the onboard infrastructure. As a result, it is possible to stabilize the power supply system of the autonomous driving system. A power supply line of the autonomous driving system is constituted by two lines: a power supply line from a DC-DC converter and a power supply line from a battery. Accordingly, even when an abnormality occurs in one power supply line, the autonomous driving system can continue to be supplied with electric power using the other power supply line.

Configuration

FIG. 1 is a diagram schematically illustrating a configuration of a power supply system for a vehicle 1 according to an embodiment of the disclosure. The power supply system for a vehicle 1 illustrated in FIG. 1 includes a first DC-DC converter (DDC) 21, a connection control unit 51, a first power supply system 100, a second power supply system 200, a third power supply system 300, and a high-voltage battery 10. The first power supply system 100 includes a first battery 31 and is connected to a first load 41. The second power supply system 200 includes a second DC-DC converter (DDC) 22 and a second battery 32 and is connected to a second load 42. The third power supply system 300 includes a connection controller 23 and a third battery 33 and is connected to a third load 43. The power supply system for a vehicle 1 is mounted in a hybrid vehicle, an electric vehicle, or the like that can execute automated driving.

The high-voltage battery 10 is a battery of a high voltage that is configured to be charged and discharged and may be, for example, a lithium-ion battery or a nickel-hydride battery. The high-voltage battery 10 is connected to the first DC-DC converter 21, the second DC-DC converter and predetermined devices which are required for driving a vehicle such as a motor generator (MG) which is not illustrated. The high-voltage battery 10 supplies electric power of a high voltage to the first DC-DC converter 21, the second DC-DC converter 22, and the predetermined devices in parallel via a junction box (J/B) serving as a divider or a breaker.

First Power Supply System

The first power supply system 100 is a power supply system for supplying electric power for operation of a load to a load such as a device constituting an autonomous driving system for executing automated driving, which is provided for the vehicle by an original equipment manufacturing (OEM) company, a mobility-as-a-service (MaaS) provider, or the like. The device constituting the autonomous driving system may be introduced into the vehicle in advance at the time of shipment or may be introduced (retrofitted) into the vehicle after shipment thereof. The first power supply system 100 is constructed to be isolated from the second power supply system 200 and the third power supply system 300 for an onboard infrastructure which will be described later.

The first DC-DC converter 21 converts electric power of a high voltage which is supplied from the high-voltage battery 10 into electric power of a predetermined lower voltage and outputs (supplies) the convened electric power to the first battery 31, the first load 41, and the connection control unit 51. The predetermined low voltage is a voltage which is required for operating the device constituting the autonomous driving system provided for the vehicle by an OEM company, a MaaS provider, or the like.

The first battery 31 is a power storage element configured to be charged and discharged such as a lead storage battery or a lithium-ion battery. The first battery 31 is configured to store electric power which is output from the first DC-DC converter 21 via the connection control unit 51 and to supply electric power to the first load 41.

The first load 41 is a device that is provided by an OEM company, a MaaS provider, or the like and may be, for example, a device including an autonomous driving system 411 and another device 412. The autonomous driving system 411 is a device that controls automated driving of the vehicle. The autonomous driving system 411 generates path data (data such as a road on which the vehicle is scheduled to run by automated driving or a running speed) which is an automated driving plan. The autonomous driving system 411 includes two power supply lines and is configured to operate by being supplied with electric power via at least one power supply line. The other device 412 is a device which is associated with automated driving other than the autonomous driving system 411 and a cooler 413. The other device 412 may be omitted as long as it is not a device which is essential for an automated driving operation by the autonomous driving system 411. In this embodiment, an example in which the autonomous driving system 411, the cooler 413, and the other device 412 are provided as devices constituting the autonomous driving system in the vehicle in which the first battery 31 and the first DC-DC Converter 21 are assembled has been described above. However, one or both of the first battery 31 and the first DC-DC converter 21 may not be assembled in the vehicle in advance but may be retrofitted to the vehicle along with the devices constituting the autonomous driving system or the like.

The connection control unit 51 is inserted between the first DC-DC converter 21 and the first battery 31 and controls connection states between the first DC-DC converter 21 and the first battery 31 and the autonomous driving system 411. The connection control unit 51 includes a coupling device (CD) 511, a first rectifier element 512, and a second rectifier element 513.

The coupling device 511 is inserted between the first DC-DC converter 21 and the first battery 31 such that a connection state between the first DC-DC converter 21 and the first battery 31 can be controlled. The coupling device 511 may be a DC-DC converter that converts (equalizes, steps up, or steps down) an input voltage and outputs the converted voltage, a semiconductor relay that switches between a connected state and a disconnected state, or the like.

The first rectifier element 512 is an active element that can allow a current to flow in one direction and may be, for example, a diode. The first rectifier element 512 is provided between a power supply line connecting the first DC-DC converter 21 and the coupling device 511 and a power supply line of the autonomous driving system 411 to perform rectification from the first DC-DC converter 21 to the autonomous driving system 411.

The second rectifier element 513 is an active element that can allow a current to flow in one direction and may be, for example, a diode. The second rectifier element 513 is provided between a power supply line connecting the first battery 31 and the coupling device 511 and the power supply line of the autonomous driving system 411 to perform rectification from the first battery 31 to the autonomous driving system 411.

Second Power Supply System

The second power supply system 200 is a power supply system that supplies electric power for operation of a load to loads connected to the onboard infrastructure which is constructed to realize various functions mounted in the vehicle at the time of design in addition to functions which are provided by an OEM company, a MaaS provider, or the like after design.

The second DC-DC converter 22 converts electric power of a high voltage which is supplied from the high-voltage battery 10 into electric power of a predetermined low voltage and outputs (supplies) the convened electric power to the connection controller 23, the second battery 32, and the second load 42. The predetermined low voltage may be set to a voltage which is required for allowing the second load 42 of the onboard infrastructure to operate. The second DC-DC converter 22 includes an inverter or a step-up converter which is not illustrated, and may be configured as a part of a power control unit (PCU) that controls a powering, operation and a regenerative operation by the power generator (MG).

The second battery 32 is a power storage element configured to be charged and discharged such as a lead storage battery or a lithium-ion battery. The second battery 32 is configured to store electric power which is output from the second DC-DC converter 22 and to output (supply) electric power which is stored therein to the second load 42 or the connection controller 23.

The second load 42 includes, for example, an ECU 422 that controls steering (EPS), an ECU 423 that controls a brake, an interface box (I/F_BOX) 424, and a general device 421 which is mounted in the vehicle in addition to the above-mentioned devices. The steering ECU 422 and the brake ECU 423 may be controlled based on path data which is an automated driving plan generated by the autonomous driving system 411. The interface box 424 is an information communication unit that transmits and receives information between the autonomous driving system 411 which is provided by an OEM company, a MaaS provider, or the like and various system mounted in the vehicle and serves as a gateway. The interface box 424 communicates with the autonomous driving system 411, acquires path data which is an automated driving plan of the vehicle generated by the autonomous driving system 411. The interface box 42 may store the acquired path data.

Third Power Supply System

The third power supply system 300 is a power supply system that is redundantly configured for the purpose of backup of the second power supply system 200. The third power supply system 300 is configured to allow a load required for safe escape behavior of the vehicle to operate continuously in an emergency such as when a power failure occurs in the second power supply system 200.

The connection controller 23 is inserted between the second DC-DC converter and the third load 43 and controls a connection state between the second DC-DC converter 22 and the third load 43. The connection controller 23 may be constituted, for example, by a semiconductor relay that switches between a connected state and a disconnected state or a DC-DC converter that converts (equalizes, steps up, or steps down) an input voltage and outputs the converted voltage. The connection controller 23 outputs (supplies) some electric power which is output from the second DC-DC converter 22 to the third battery 33 and the third load 43.

The third buttery 33 is a power storage element configured to be charged and discharged such as a lead storage battery or a lithium-ion battery. The third battery 33 is configured to store electric power which is output from the connection controller 23 and supply electric power to the third load 43.

The third load 43 includes, for example, an ECU 431 that control steering (EPS), an ECU 432 that controls a brake, and the interface box (I/F_BOX) 424. The steering ECU 431 is a redundant element with the same function as the steering ECU 422. The brake ECU 432 is a redundant element with the same function as the brake ECU 423.

In the above-mentioned configuration example of this embodiment, a redundant configuration in which the steering ECUs and the brake ECUs are independently connected to the second power supply system 200 and the third power supply system 300 is employed, but single elements may be configured to be supplied with electric power from both the second power supply system 200 and the third power supply system 300. The interface box 424 is configured as a single element which can be supplied with electric Power from both the second power supply system 200 and the third power supply system 300, but a redundant configuration in which two interface boxes are independently connected to the second power supply system 200 and the third power supply system 300 may be employed.

Operations Based on Configuration

An example of operations which can be realized in the power supply system for a vehicle 1 including the first power supply system 100, the second power supply system 200, and the third power supply system 300 will be described below.

In the power supply system for a vehicle 1, the first power supply system 100 including the autonomous driving system 411 is configured to be isolated from the second power supply system 200 and the third power supply system 300 of the onboard infrastructure. That is, isolation of the power supply systems is achieved by inserting the DC-DC converters 21 and 22 that can suppress a voltage variation between the first power supply system 100 and the second power supply system 200 and the third power supply system 300. With this configuration, the autonomous driving system 411 can be restrained from being affected by a voltage variation which is generated in the second load 42 and the third load 43 which are connected to the onboard infrastructure, for example, a voltage variation which is generated due to a load including an actuator (such as a motor) having large power consumption such as a steering unit or a brake. Accordingly, since the first power supply system 100 to which the autonomous driving system 411 is connected can be stabilized and the autonomous driving system 411 can be restrained from being reset (reset risk) due to a voltage variation, it is possible to allow automated driving to operate optimally.

In the power supply system for a vehicle 1, since the voltage of the first power supply system 100 is not likely to vary, it is possible to redundantly construct the first power supply system 100 for the autonomous driving system 411 by only inserting the connection control unit 51 between the first DC-DC converter 21 and the first battery 31 without newly adding a battery for absorbing a voltage variation in addition to the first battery 31.

By the operation of the connection control unit 51, the first battery 31 can be electrically isolated from the first DC-DC converter 21 and electric power output from the first DC-DC converter 21 can be supplied to the autonomous driving system 411 via the first rectifier element 512, for example, when an abnormality such as a ground fault occurs on the first battery 31 side. For example, when an abnormality such as a decrease in output occurs on the first DC-DC converter 21 side, the first battery 31 can be electrically isolated from the first DC-DC converter 21 and electric power stored in the first battery 31 can be supplied to the autonomous driving system 411 via the second rectifier element 513. In this way, in the power supply system for a vehicle 1, even when an abnormality occurs in any one of the first DC-DC converter 21 and the first battery 31 during automated driving, it is possible to continuously perform automated driving using the first power supply system 100.

The other device 412 is preferably connected to a power supply line connecting the first DC-DC converter 21 to the coupling device 511 in order to curb unnecessary power consumption of the first battery 31 in an emergency such as when a power failure occurs in the first power supply system 100. For example, a fan that cools an electronic control unit (not illustrated) emitting heat at the time of operation of the autonomous driving system 411 corresponds to an actuator having large power consumption. Accordingly, when the fan is connected to the power supply line connecting the first DC-DC converter 21 to the coupling device 511 similarly to the other device 412, a component with a high cost and high performance having fast responsiveness to a voltage variation is required as the first DC-DC converter 21 in order to curb a voltage variation in the first power supply system 100. Accordingly, from the viewpoint of a decrease in cost of the power supply system for a vehicle 1, the cooling fan of the autonomous driving system 411 is preferably connected to a power supply system other than the first power supply system 100, for example, the second power supply system 200.

The coupling device 511 may perform isolation of the first DC-DC converter 21 from the first battery 31 by determining whether a power failure occurs in the first power supply system 100, or may perform the isolation in accordance with an instruction from a control ECU (not illustrated) that can determine a power failure state of the first power supply system 100.

In the power supply system for a vehicle 1, path data which is an automated driving plan generated by the autonomous driving system 411 may be stored in the interface box 424. Accordingly, for example, even when the autonomous driving system 411 is stopped or reset due to occurrence of a power failure of the first power supply system 100 (an abnormality occurring in both the first DC-DC converter 21 and the first battery 31) at the time of running by automated driving, the steering ECU 422 and the brake ECU 423 can be optimally controlled in accordance with the path data stored in the interface box 424 and the vehicle can be operated until a safe state such as a state in which the vehicle is stopped on a road shoulder is achieved.

In addition, even when a power failure occurs in the second battery 32 of the second power supply system 200, the functions of the steering ECU 422 and the brake ECU 423 stop, but the steering ECU 431 and the brake ECU 432 can continue to operate using the third battery 33 of the third power supply system 300. Accordingly, the steering ECU 431 and the brake ECU 432 can be optimally controlled in accordance with the path data stored in the interface box 424 and the vehicle can be operated until a safe state such as a state in which the vehicle is stopped on a road shoulder is achieved.

Operations and Advantages of this Embodiment

As described above, in the power supply system for a vehicle 1 according to this embodiment, the first power supply system 100 to which the autonomous driving system 411 is connected is isolated from the second power supply system 200 and the third power supply system 300 of the onboard infrastructure. Accordingly, the first power supply system 100 to which the autonomous driving system 411 is connected can be restrained from being affected by a voltage variation which is generated due to the second load 42 and the third load 43 of the onboard infrastructure. Accordingly, it is possible to correspond to a failsafe and to stabilize the power supply system of the autonomous driving system 411, and automated driving can be operated optimally.

With the power supply system for a vehicle 1 according to this embodiment, a reset risk of the first load 41 due to a voltage variation which is generated due to a load group of the onboard infrastructure is decreased by isolating the power supply system of the autonomous driving system 411 from the power supply system of the onboard infrastructure. Accordingly, it is possible to redundantly construct the first power supply system 100 with a simple circuit including the coupling device 511, the first rectifier element 512, and the second rectifier element 513 without adding a new battery. Accordingly, when an abnormality occurs in one of the first DC-DC converter 21 and the first battery 31 during execution of automated driving, it is possible to continuously execute automated driving using the first power supply system 100.

What is claimed is:

1. A power supply system for a vehicle, comprising:
a high-voltage battery;
a first power supply arrangement supplied with electric power from the high-voltage battery;
a second power supply arrangement supplied with the electric power from the high-voltage battery; and
a third power supply arrangement supplied with the electric power from the high-voltage battery,
wherein
the first power supply arrangement is connected to a first load including at least an autonomous driving system,
the first power supply arrangement includes a first DC-DC converter, a first battery, and a connection control unit,
the first DC-DC converter is configured to convert a voltage of electric power which is supplied from the high-voltage battery and to output voltage-converted electric power,
the first battery is supplied with electric power output from the first DC-DC converter,
the connection control unit is connected between the first DC-DC converter and the first battery, the connection control unit is configured to control a connection state between the first DC-DC converter and the autonomous driving system and a connection state between the first battery and the autonomous driving system, the second power supply arrangement is connected to a second load including at least a steering electronic control unit, a brake electronic control unit, and an information communication unit, the information communication unit is configured to transmit control information to the autonomous driving system and to receive the COMA information from the autonomous driving system, the second power supply arrangement includes a second DC-DC converter and a second battery, the second DC-DC converter is configured to convert the voltage of electric power which is supplied from the high-voltage battery and to output voltage-converted electric power, the second battery is supplied with electric power output from the second DC-DC converter, the second power supply arrangement is configured to supply the electric power output from the second DC-DC converter and electric power of the second battery to the second load, the third power supply arrangement is connected to a third load including at least the steering electronic control unit, the brake electronic control unit, and the information communication unit, the third power supply arrangement includes a connection controller and a third battery, the connection controller is configured to control a connection state between the second DC-DC converter and the third load, the third battery is supplied with electric power output from the second DC-DC converter via the connection controller, and the third power supply arrangement is configured to supply the electric power output from the second DC-DC converter to the third load via the connection controller and to supply electric power of the third battery to the third load.

2. The power supply system according to claim 1, wherein the connection controller includes:
a coupling device configured to control a connection state between the first DC-DC converter and the first battery;
a first rectifier element provided between a first power supply line and a power supply line of the autonomous driving system, the first power supply line connecting the first DC-DC converter and the coupling device, and the first rectifier element performing rectification from the first DC-DC converter to the autonomous, driving system; and
a second rectifier element provided between a second power supply line and the power supply line of the autonomous driving system, the second power supply line connecting the first battery and the coupling device, and the second rectifier element performing rectification from the first battery to the autonomous driving system.

3. The power supply system according to claim 2, wherein the coupling device is configured to electrically isolate the first battery from the first DC-DC converter when an abnormality occurs in any one of the first DC-DC converter and the first battery.

4. The power supply system according to claim 1, wherein the connection controller is a third DC-DC converter configured to convert a voltage of input electric power and to output voltage-converted electric power or a semiconductor relay configured to switch between a connected state and a disconnected state.

5. The power supply system according to claim 1, wherein the autonomous driving system is configured to control the steering electronic control unit and the brake electronic control unit based on the control information.

6. The power supply system according to claim 1, wherein the information communication unit is configured to store the control information received from the autonomous driving system.

7. The power supply system according to claim 1, wherein the control information includes information on an automated driving plan which is generated by the autonomous driving system.

* * * * *